(12) United States Patent
Buterbaugh et al.

(10) Patent No.: US 9,214,809 B2
(45) Date of Patent: *Dec. 15, 2015

(54) DYNAMICALLY CONFIGURING CURRENT SHARING AND FAULT MONITORING IN REDUNDANT POWER SUPPLY MODULES

(75) Inventors: Jerrod K. Buterbaugh, Wake Forest, NC (US); Timothy C. Daun-Lindberg, Rochester, MN (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 535 days.

This patent is subject to a terminal disclaimer.

(21) Appl. No.: 13/459,364

(22) Filed: Apr. 30, 2012

(65) Prior Publication Data

US 2012/0212058 A1 Aug. 23, 2012

Related U.S. Application Data

(63) Continuation of application No. 12/179,177, filed on Jul. 24, 2008, now Pat. No. 8,217,531.

(51) Int. Cl.
*H02J 7/34* (2006.01)
*H02J 1/10* (2006.01)

(52) U.S. Cl.
CPC .............. *H02J 1/10* (2013.01); *Y10T 307/50* (2013.01); *Y10T 307/544* (2013.01); *Y10T 307/549* (2015.04); *Y10T 307/555* (2013.01)

(58) Field of Classification Search
USPC ....................... 307/53; 700/297; 361/31, 93.9
See application file for complete search history.

(56) References Cited

U.S. PATENT DOCUMENTS

| 4,104,718 A | 8/1978 | Poublan et al. |
| 4,257,090 A | 3/1981 | Kroger et al. |
| 4,720,758 A | 1/1988 | Winslow |
| 4,924,170 A | 5/1990 | Henze |
| 5,251,157 A | 10/1993 | Prather |
| 5,297,014 A | 3/1994 | Saito et al. |
| 5,315,533 A | 5/1994 | Stich et al. |

(Continued)

FOREIGN PATENT DOCUMENTS

WO        WO 01/24338 A1    4/2001

OTHER PUBLICATIONS

Saunders: "Automatic Multi-Level Overcurrent Protection Circuit", IBM Technical Disclosure Bulletin (TDB) Aug. 1985, Document No. AAA85A061772, pp. 1054-1056, International Business Machines Corporation, USA.

(Continued)

*Primary Examiner* — Rexford Barnie
*Assistant Examiner* — Xuan Ly
(74) *Attorney, Agent, or Firm* — Edward J. Lenart; Katherine S. Brown; Kennedy Lenart Spraggins LLP

(57) ABSTRACT

Methods, apparatus, and products for dynamically configuring current sharing and fault monitoring in redundant power supply modules for components of an electrically powered system, including summing, by a master service processor, during powered operation of the system, the present power requirements of components presently installed in the electrically powered system and setting, by the master service processor for each redundant power supply module in dependence upon the sum of the present power requirements, a current sharing tolerance and a fault reporting tolerance.

20 Claims, 6 Drawing Sheets

(56) References Cited

U.S. PATENT DOCUMENTS

| | | | |
|---|---|---|---|
| 5,428,524 A * | 6/1995 | Massie | 363/79 |
| 5,745,356 A | 4/1998 | Tassitino et al. | |
| 5,831,807 A | 11/1998 | Masannek et al. | |
| 5,834,925 A | 11/1998 | Chesavage | |
| 5,999,421 A | 12/1999 | Liu | |
| 6,084,790 A | 7/2000 | Wong | |
| 6,157,555 A | 12/2000 | Hemena et al. | |
| 6,301,133 B1 | 10/2001 | Cuadra et al. | |
| 6,320,771 B1 | 11/2001 | Hemena et al. | |
| 6,356,471 B1 | 3/2002 | Fang | |
| 6,539,486 B1 | 3/2003 | Rolls et al. | |
| RE38,371 E | 12/2003 | Dinh | |
| 6,664,657 B2 | 12/2003 | Hailey | |
| 6,785,827 B2 | 8/2004 | Layton et al. | |
| 6,803,679 B1 | 10/2004 | Luo et al. | |
| 6,836,099 B1 | 12/2004 | Amarillas et al. | |
| 7,058,833 B1 | 6/2006 | Bremer et al. | |
| 7,126,315 B2 | 10/2006 | Seo | |
| 7,493,503 B2 | 2/2009 | Aldereguia et al. | |
| 7,861,103 B2 | 12/2010 | Buterbaugh et al. | |
| 2003/0122530 A1 | 7/2003 | Hikita | |
| 2003/0227730 A1 | 12/2003 | Limura et al. | |
| 2004/0090219 A1 | 5/2004 | Chapuis | |
| 2004/0117477 A1 * | 6/2004 | Kaminsky et al. | 709/224 |
| 2004/0193926 A1 | 9/2004 | Vogman | |
| 2005/0080516 A1 | 4/2005 | Pincu et al. | |
| 2006/0098368 A1 | 5/2006 | Gentillet et al. | |
| 2006/0242438 A1 * | 10/2006 | Baba et al. | 713/300 |
| 2007/0022318 A1 * | 1/2007 | Copenhaver et al. | 714/11 |
| 2008/0054720 A1 | 3/2008 | Lum | |
| 2008/0129260 A1 | 6/2008 | Abu Qahouq et al. | |
| 2010/0019576 A1 | 1/2010 | Buterbaugh et al. | |
| 2010/0156361 A1 | 6/2010 | Barrenscheen | |

OTHER PUBLICATIONS

Radcliffe: "Continuously Adjustable Power Supply Overcurrent Protection Circuit", IBM Technical Disclosure Bulletin (TDB) Jul. 1986, Document No. AAA86A061626, p. 806, International Business Machines Corporation, USA.

Hochdoerfer: "Processor Power Control and Monitoring System", IBM Technical Disclosure Bulletin (TDB) Dec. 1988, Document No. AAA88A062064, pp. 198-201, International Business Machines Corporation, USA.

Office Action, U.S. Appl. No. 12/179,177, Apr. 1, 2010, pp. 1-14.

Office Action, U.S. Appl. No. 12/179,177, Sep. 7, 2010, pp. 1-15.

Final Office Action, U.S. Appl. No. 12/179,177, Mar. 2, 2011, pp. 1-17.

Notice of Allowance, U.S. Appl. No. 12/179,177, Oct. 11, 2011, pp. 1-9.

Office Action, U.S. Appl. No. 11/696,283, Apr. 1, 2010, pp. 1-10.

Notice of Allowance, U.S. Appl. No. 11/696,283, Aug. 11, 2010, pp. 1-7.

Notice of Allowance, U.S. Appl. No. 12/179,177, Mar. 2, 2012, pp. 1-7.

* cited by examiner

DYNAMICALLY CONFIGURING CURRENT SHARING AND FAULT MONITORING IN REDUNDANT POWER SUPPLY MODULES

CROSS-REFERENCE TO RELATED APPLICATION

This application is a continuation application of and claims priority from U.S. patent application Ser. No. 12/179,177, filed on Jul. 24, 2008.

BACKGROUND OF THE INVENTION

1. Field of the Invention

The field of the invention is data processing, or, more specifically, methods, apparatus, and products for dynamically configuring current sharing and fault monitoring in redundant power supply modules.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of computer technology that has seen substantial advances is power supply technology. Computer power supplies are designed to meet the maximum load expected in a given product installation. If the product has multiple option bays (e.g., PCI adapter slots or drive bays), then the power supply must be capable of powering the product with all system slots populated with devices having the maximum wattage allowed in any given slot. Furthermore, some power supplies are implemented in a redundant configuration where current load is shared between the power supplies. In active current sharing systems, the power supplies share the current load within a particular tolerance. The power supplies also report current sharing faults when the difference in the amount of current load shared between the power supplies exceeds that a predetermined amount, called a fault reporting tolerance. In power supplies today such tolerances are static values, set by the manufacturer of the power supply an unchangeable during operation of the power supply. Currently there remains a need to reconfigure such tolerances dynamically and automatically without human intervention during operation of the power supplies.

SUMMARY OF THE INVENTION

Methods, apparatus, and products for dynamically configuring current sharing and fault monitoring in redundant power supply modules for components of an electrically powered system, including summing, by a master service processor, during powered operation of the system, the present power requirements of components presently installed in the electrically powered system and setting, by the master service processor for each redundant power supply module in dependence upon the sum of the present power requirements, a current sharing tolerance and a fault reporting tolerance.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
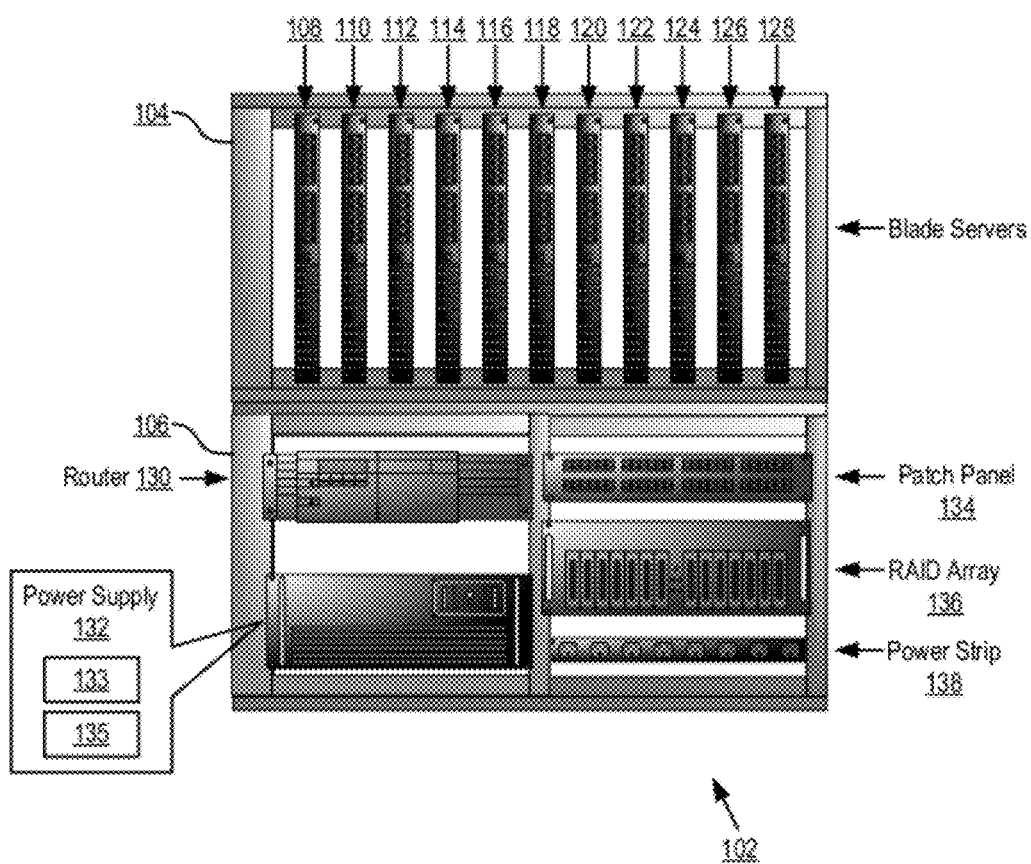
FIG. 1 sets forth a front view of an exemplary electrically powered system in which current sharing and fault monitoring in redundant power supply modules is dynamically configured according to embodiments of the present invention.

Exemplary methods, systems, and products for dynamically configuring current sharing and fault monitoring in redundant power supply modules according to embodiments of the present invention are described with reference to the accompanying drawings, beginning with FIG. 1. FIG. 1 sets forth a front view of an exemplary electrically powered system (102) in which current sharing and fault monitoring in redundant power supply modules is dynamically configured according to embodiments of the present invention. The system of FIG. 1 operates generally to dynamically configure current sharing and fault monitoring in redundant power supply modules according to embodiments of the present invention by summing, by a master service processor, during powered operation of the system, the present power requirements of components presently installed in the electrically powered system and setting, by the master service processor for each redundant power supply module in dependence upon the sum of the present power requirements, a current sharing tolerance and a fault reporting tolerance.

Any electrically powered system or apparatus that includes a power supply and components with individual power requirements can be improved for dynamic configuration of current sharing and fault monitoring in redundant power supply modules according to embodiments of the present invention. Examples of such electrically powered systems include electrical appliances such as copiers, computer peripherals such as monitors and printers, portable and embedded systems, desktop computers, server systems such as installations of blade servers, and supercomputers—which have substantial power management challenges. The example electrically powered system (102) of FIG. 1 includes two cabinet bays (104, 106), each of which includes several components, each component having a power requirement. Cabinet bay (104) contains eleven blade servers (108-128), components of the electrically powered system, each of which is powered by a power supply (132) containing a pair of redundant power supply modules (133, 135). Cabinet bay (106) contains the power supply (132) for the electrically powered system (102) and a data communications network router (130), another component of the electrically powered system, which also is powered by the power supply (132). Cabinet bay (106) also contains additional components of the electrically powered system: a patch panel (134), a Redundant Array of Independent Disks ('RAID') (136), and a power strip (138). The RAID array (136) is also powered by the power supply (132).

In the example of FIG. 1, the power supply (132) includes a pair of redundant power supply modules (133, 135). The pair of power supply modules provide redundant power to components of the electrically power system. If one power supply module fails, the remaining operational module supplies power to those components previously supplied power by the failed module. Each of the redundant power supply modules is capable of operating as a non-redundant power supply, supplying power to components without need the other module. Readers of skill in the art will immediately recognize that although the redundant power supply modules (133, 135) are configured as a single power supply (132) other configurations of power supply modules (133, 135) are possible and well within the scope of the present invention. In some embodiments, for example, each of the redundant power supply modules is itself a separate power supply.

The power supply (132) in the example of FIG. 1 also includes a master service processor that is programmed to dynamically configure current sharing and fault monitoring. Current sharing is a technique in which multiple power supply modules share the current load of powering the same components or set of components. Sharing current load between multiple power supply modules reduces operating stresses of the power supply modules, such as heat generation, thereby increasing reliability of the power supply module.

Each power supply module (133, 135) includes a current sharing circuit connected together through a load share bus with the current sharing circuits operating against a current sharing tolerance. The current sharing circuit implements an active control algorithm, a closed-loop feedback algorithm that dynamically changes the amount of current supplied by a power supply module in dependence upon information provided by another power supply module through the load share bus and in dependence upon the current sharing tolerance which is used by the closed-loop feedback algorithm to set upper and lower limits for current supply of a power module. That is, the current sharing tolerance specifies a preferred maximum amount from which current sharing of one power supply module may vary from another. Consider as an example a current tolerance of 10% with a first power supply module providing 1.5 Amperes (amps). A second power supply module may provide current in parallel with the first power supply module in accordance with the 10% current sharing tolerance by providing current from 1.35 amps to 1.65 amps. The current sharing tolerance is described here as a 'preferred' maximum amount because as is typical in closed-loop feedback algorithms, the actual value of the amount from which current sharing of one power supply module varies from another may occasionally exceed that preferred amount for short periods of time until the control algorithm brings the actual value below the preferred maximum amount.

Each power supply module also includes fault monitoring logic that implements fault monitoring for the power supply module. The fault monitoring logic dynamically monitors actual current sharing performance of the power supply module, determines whether the actual current sharing performance of the power supply module exceeds a predetermined threshold referred to in this specification as the 'fault reporting tolerance,' and if the actual current sharing performance of the power supply module exceeds the predetermined threshold, sends a report to the master service processor of the power supply. The fault reporting tolerance is similar to the current sharing tolerance in that the fault reporting tolerance is maximum amount from which current sharing of one power supply module may vary from another. When the value of the actual amount from which current sharing of a first power supply module varies from another exceeds the fault reporting tolerance, the fault monitoring logic issues a fault report. As mentioned above, the actual value of the amount from which current sharing of one power supply module varies from another may occasionally exceed that amount specified by the current sharing tolerance. As such, fault reporting tolerances are typically set higher than current sharing tolerances. If a current sharing tolerance is 10%, for example, a fault reporting tolerance may be 15-20%. Continuing with the above example of a first power supply providing 1.5 amps and a current sharing tolerance of a 10%, if the power supply modules have a fault reporting tolerance of 20%, the second power supply module will issue a report when the power supply module supplies current less than 1.2 amps or greater than 1.8 amps.

Current sharing and fault monitoring in redundant power supply modules of an electrically powered system according to embodiments of the present invention is 'dynamically configured' in the sense that such current sharing and fault monitoring is configured during actual powered operation of the system—automatically by a processor of the system itself—as opposed to being configured statically during manufacturing or statically configured by user-modifiable system parameters. That is, systems according to embodiments of the present invention support variable current sharing tolerances and fault reporting tolerance, tolerances amenable to change during powered operation of the system. Moreover, such a system carries out dynamic configuration of current sharing and fault monitoring in the sense that the system sums actual present power requirements of system components dynamically during powered operation of the system.

The arrangement of components in the example system of FIG. 1, the power supply, RAID array, servers, and other devices making up the exemplary system illustrated in FIG. 1, are for explanation, not for limitation. Electrically powered systems useful for dynamically configuring current sharing and fault monitoring in redundant power supply modules according to various embodiments of the present invention may include additional servers, routers, other devices, not shown in FIG. 1, as will occur to those of skill in the art. Various embodiments of the present invention may be implemented on a variety of hardware platforms in addition to those illustrated in FIG. 1.

Figure 2:
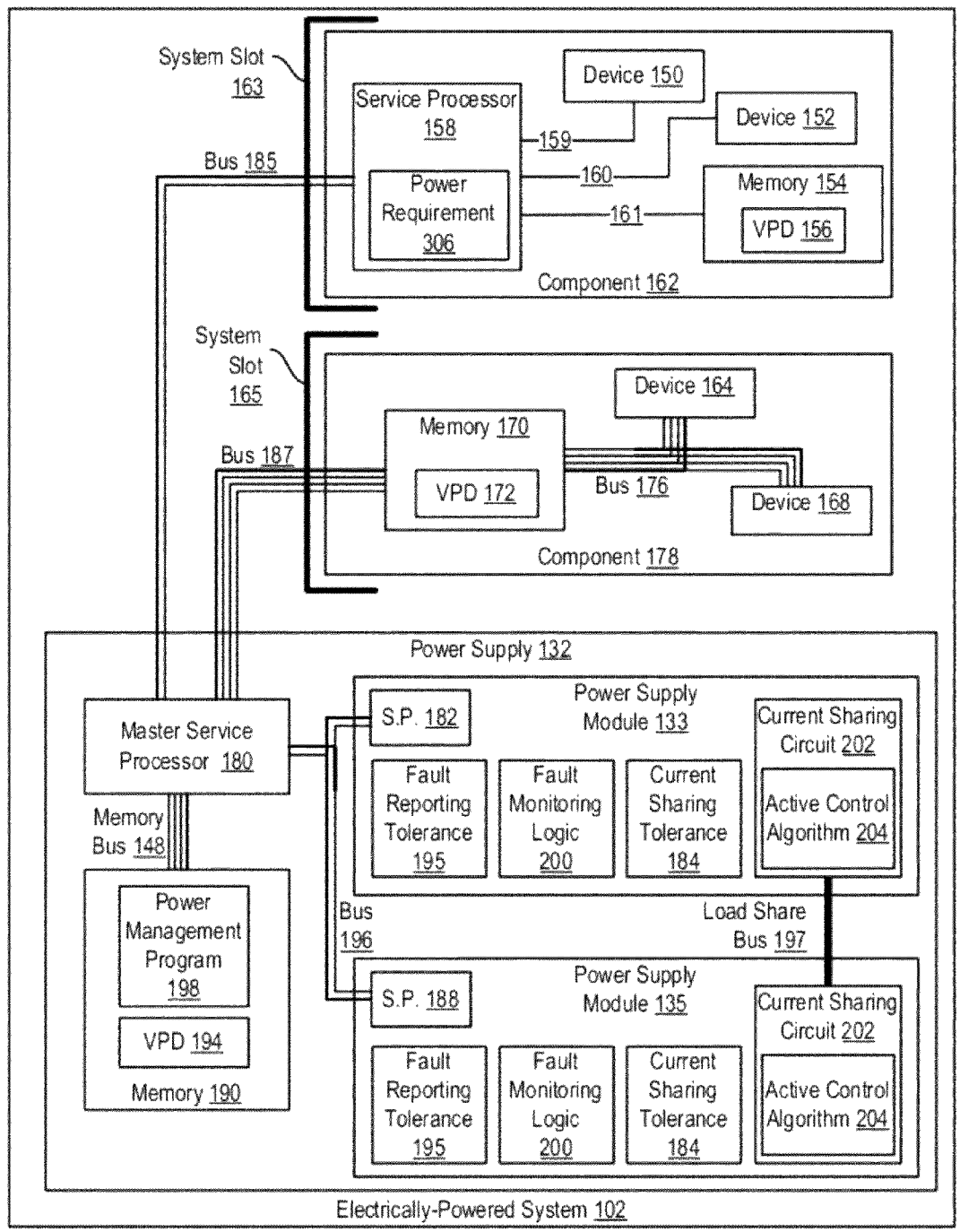
FIG. 2 sets forth a functional block diagram of an exemplary electrically powered system that dynamically configures current sharing and fault monitoring in redundant power supply modules according to embodiments of the present invention.

For further explanation, FIG. 2 sets forth a functional block diagram of an exemplary electrically powered system (102) that dynamically configures current sharing and fault monitoring in redundant power supply modules for components (162, 178) of the system according to embodiments of the present invention. The system of FIG. 2 includes a power supply (132) that supplies electrical power to the components of the system.

The power supply includes a master service processor (180) connected by a memory bus (148) to computer memory (190) in which is disposed a power management program (198), a module of computer program instructions that carries out dynamic configuration of current sharing and fault monitoring by causing the master service processor (180) to sum, during powered operation of the system, the present power requirements of components (162, 178) presently installed in the system and set for each power supply module (133, 135) a current sharing tolerance (184) and a fault reporting tolerance (195) in dependence upon the sum of the present power requirements. The computer memory (190) and the power management program are shown as a separate device connected to the master service (180) processor through a bus (148). Readers will recognize, however, that such devices may be implemented as an embedded system in which the computer memory (190), the power management program (198), and the master service processor (180) are all implemented as a single device.

In addition to the master service processor (180), the system of FIG. 2 includes three other service processors, one service processor (158) installed in a component (162) of the system and two service processors (182, 188) in the power supply. A service processor is a separate, dedicated internal processor often located on the motherboard of a system component such as a server, on a PCI card, on the chassis of a blade server or telecommunications platform, or in the chassis of a power supply module. The service processor operates independently from a system's CPU and operating system, even if the CPU or OS is locked up or otherwise inaccessible. Service processors are often used to monitor a component's on-board instrumentation (temperature sensors, CPU status, fan speed, voltages, current, power requirements), provide remote reset or power-cycle capabilities, enable remote access to basic input/output system (BIOS) configuration or administrative console information, and, in some cases, provide keyboard and mouse control.

A 'master service processor,' as the term is used in this specification, is a service processor that carries out dynamic configuration of current sharing and fault monitoring according to embodiments of the present invention. In carrying out dynamic configuration of current sharing and fault monitoring according to embodiments of the present invention, a master service processor communicates with other components of an electrically powered system, including other service processors optionally installed on various components of the system. Although there are several service processors (158, 182, 188) in the present example, such configuration of components and power supply modules is only for ease of explanation, not a limitation of the present invention. There is no requirement in the present invention—except for the master service processor—that any of the components or power supply modules of an electrically powered system that dynamically configures current sharing and fault monitoring must have a service processor.

The power supply (132) in this example is configured to reduce the risk of interruption of its supply of power to components of the system by inclusion of two redundant power supply modules (133, 135), each of which is provided with the current sharing tolerance (184) and fault reporting tolerance (195). During normal powered operation of the system, the two power supply modules provide power to components of the system, operating in parallel thereby sharing the current load of the components. If one power supply module fails, then the responsibility for providing power is transferred to the remaining power supply module.

The master service processor (180) is connected to the service processors (182, 188) in the power supply modules (133, 135) by bus (196), and the master service processor (180) is connected to the service processor (158) in component (162) by bus (185). Both bus (196) and bus (185) are service-level buses for out-of-band communications of data and instructions between a master service processor and other service processors. Examples of bus types useful as implementations of bus (196) and bus (185) include:

- The $I^2C$ bus, a serial computer bus invented by Philips that is used to for low-speed communications with peripheral components of a system. The name stands for Inter-Integrated Circuit and is pronounced I-squared-C or sometimes as I-two-C.
- The ACCESS.bus ('A.b'), a peripheral-interconnect computer bus developed by Philips in the early 1990s. It is similar in purpose to USB, in that it allows low-speed devices to be added or removed from a computer on the fly, that is, hot swapped.
- The System Management Bus ('SMBus'), another two-wire bus used for low-bandwidth communications among components of a system, especially power related chips such as a laptop's rechargeable battery subsystem, as well as other components such temperature sensors and lid switches.
- The Intelligent Platform Management Bus ('IPMB'), a protocol of the Intelligent Platform Management Interface ('IPMI') specification, originally developed by Dell, HP, Intel, and NEC, defines a set of common interfaces to computer hardware and firmware designed to monitor system health and manage the system. The IPMB is an enhanced implementation of $I^2C$.
- The Universal Serial Bus ('USB'), a serial bus standard for communications among hot swappable peripheral devices. Originally designed for computers, its flexibility has placed USB buses on video game consoles, PDAs, portable DVD and media players, cellphones; and even devices such as televisions, home stereo equipment, digital audio players, car stereos, and portable memory devices.
- Others as will occur to those of skill in the art.

In the example of FIG. 2, the master service processor may detect a change in a configuration of the components of the electrically powered system, and sum the present power requirements of components (162, 178) and set a current sharing tolerance (184) and fault reporting tolerance (195) for the power supply modules (133, 135) as a response to detecting the change in configuration. The master service processor may detect a change in configuration by detecting hot swapping of components of the system. Hot swapping or hot plugging is the ability to remove and replace components of an electrically powered system or machine, typically a computer, while the system is operating. Once the appropriate software is installed on the computer, a user can plug and unplug the component without rebooting. Examples of hot swapping functionality useful in systems that dynamically configure current sharing and fault monitoring according to embodiments of the present invention include the Universal Serial Bus ('USB') and the ACCESS.bus ('A.b').

Other protocols that now support hot swapping include:
- PCMCIA, a peripheral interface designed for laptop computers. Originally designed for memory expansion, but now used on peripheral components of many kinds, including network cards, modems and hard disks.

The IEEE 1394 interface, Apple's FireWire™, also defines a backplane interface, and is a serial bus interface standard, offering high-speed communications and isochronous real-time data services.

Fibre Channel, a gigabit-speed network technology primarily used for storage networking Fibre Channel is standardized in the T11 Technical Committee of the InterNational Committee for Information Technology Standards ('INCITS'), an American National Standards Institute accredited standards committee.

Serial Advanced Technology Attachment ('SATA'), a computer bus technology primarily designed for transfer of data to and from a hard disk.

Serial Attached SCSI ('SAS'), is a serial communication protocol for direct attached storage ('DAS') devices.

Hot swapping does not necessarily require a service processor on a hot swappable component. In the example of FIG. 2, either bus (185) or bus (187), or both of them, can be configured to support hot swapping of components. Moreover, either component (162) or component (178), or both of them, may be hot swappable.

In the example of FIG. 2, the service processor (158) on component (162) may sum into a power requirement (306) for the component (162), power requirements of devices (150, 152) in the component (162). Although component (162) is shown in this example for clarity of explanation with only two devices (150, 152), readers will recognize that in fact a component in a system that dynamically configures current sharing and fault monitoring according to embodiments of the present invention, such as, for example, a blade server or a router, may contain many individual electronic devices, such as, for example, computer processors, computer memory modules, disk drive controllers, input/output adapters, and so on, as will occur to those of skill in the art. Each such device may have its own power requirement, so that the sum of the power requirements of the devices in the component represents the present power requirement of the component. The service processor may sum the power requirements of the devices by polling the devices themselves for their power requirements, as for example by data communications through buses (159, 160). The service processor may sum the power requirements of the devices by retrieving the power requirements from previously stored information in computer memory (154). And the service processor may sum the power requirements of the devices by other means as will occur to those of skill in the art. When a master service processor (180) sums the present power requirements of components presently installed in the system, the service processor (158) on component (162) may provide to the master service processor its summed power requirement (306) as the present power requirement of component (162).

The master service processor (180) in the example of FIG. 2 may detect the presence of a component in a system slot, for example, by detecting a hot swap of the component into the system slot (163, 165), and then the master service processor may sum the present power requirements of components presently installed in the system by summing a predefined power requirement for each system slot. A 'system slot' as the term is used in this specification refers to any hardware infrastructure for connecting hot swappable components of a system to the underlying hardware framework of the system itself, including, for example, connector sockets in blade server racks, USB connectors, and any edge connector for a printed circuit board, as well as others as may occur to those of skill in the art. The predefined power requirement for each system slot may be installed in computer memory (190) in table form, for example, in a table similar to Table 1.

TABLE 1

Predefined Power Requirements Of System Slots

| Slot | Power Requirement (Watts) |
|---|---|
| 1 | 40 |
| 2 | 40 |
| 3 | 40 |
| 4 | 75 |
| 5 | 75 |
| 6 | 75 |

Using Table 1, the master service processor (180) may, upon detecting a hot swap into a particular system slot, retrieve the power requirement for the slot from Table 1, and use the retrieved power requirement when summing the present power requirements of components presently installed in the system.

In addition to summing power requirements retrieved from components or retrieved from predefined storage, the master service processor also may retrieve vital product data ('VPD') from a component in a system slot. VPD is information about a component that allows the component to be administered at a system level. VPD may be stored on the component itself (156, 172), in memory connected to the master service processor (194), or on a disk drive or other memory as may occur to those of skill in the art. VPD may include, for example, a product model number of a component, a serial number uniquely identifying a component, product release level, maintenance level, and other information specific to a type of component. Vital product data can also include user-defined information, such as the building and department location of a component. The collection and use of vital product data allows the status of a network or computer system to be understood and service provided more quickly. In this example, VPD (156, 172, 194) includes a power requirement for a component (162, 178). Using VPD, the master service processor (180) may, upon detecting a hot swap into the system of a particular component or type of component, retrieve the power requirement of such a component from VPD, and use, as the power requirement for the component in the slot, that retrieved power requirement from the component's VPD when summing the present power requirements of components presently installed in the system.

Having summed the present power requirement of components presently installed in the system, the master service processor (180) then sets an a current sharing tolerance (184) and a fault reporting tolerance (195) for each power supply module (133, 135) in dependence upon the sum of the present power requirements by calculating a current sharing tolerance and a fault reporting tolerance in dependence upon the sum and providing the calculated tolerances to the redundant power supply modules. The master service processor may provide the current sharing (184) and a fault reporting (195) tolerances to the power supply modules (133, 135) through an out-of-band network such as the one illustrated, for example, and discussed above with reference to bus (196) in FIG. 2.

The master service processor may calculate a current sharing tolerance and a fault reporting tolerance in dependence upon the sum by finding in a table that associates values of present power requirements with current sharing and fault reporting tolerances, the current sharing and fault reporting tolerances associated with the value of the sum of present power requirements. Such tolerances may be generally inversely proportional to the sum—the greater the sum, the less the tolerances; the less the sum, the greater the tolerance.

Lower current sharing tolerances result in more equal current sharing between power supplies. The increase in current load on a power supply module when another power supply module fails is greater in a system having greater power requirements and less when the system has a lesser power requirement. As such, sharing current as equally as possible between power supply modules provides the largest amount of overhead possible to all power supplies to accept such a large increase in current load upon failure of another power supply. Accepting a large current load by a power supply module when that module is supplying current near its maximum possible current supply may result in failure of the power supply module. In a system having a lesser power requirement, sharing current unequally is a lower risk as the increase in current load on a power supply module when another power supply module fails is comparatively less.

In a similar manner, fault reporting that indicates that current sharing is not precisely equally is less useful in an electrically powered system with low present power requirements and great power supply overhead. Moreover, accuracy of the performance of active control algorithms generally decreases with an increase of current supplied by redundant power supply modules. In such cases, a lower fault reporting tolerance may result in the issuance of many non-useful fault reports. The master service processor, therefore, calculates higher fault reporting tolerances for lesser sums, decreasing the number of fault reports caused by variations in current sharing, and calculates lower fault reporting tolerances for greater sums, more precisely reporting faults in current sharing. Such reports may be sent along by the master service processor (180) to a management module of the system which provides may provide the report to a user, sent along to a component of the system causing the component to power-off, or be processed in other ways as will occur to those of skill in the art.

Figure 3:
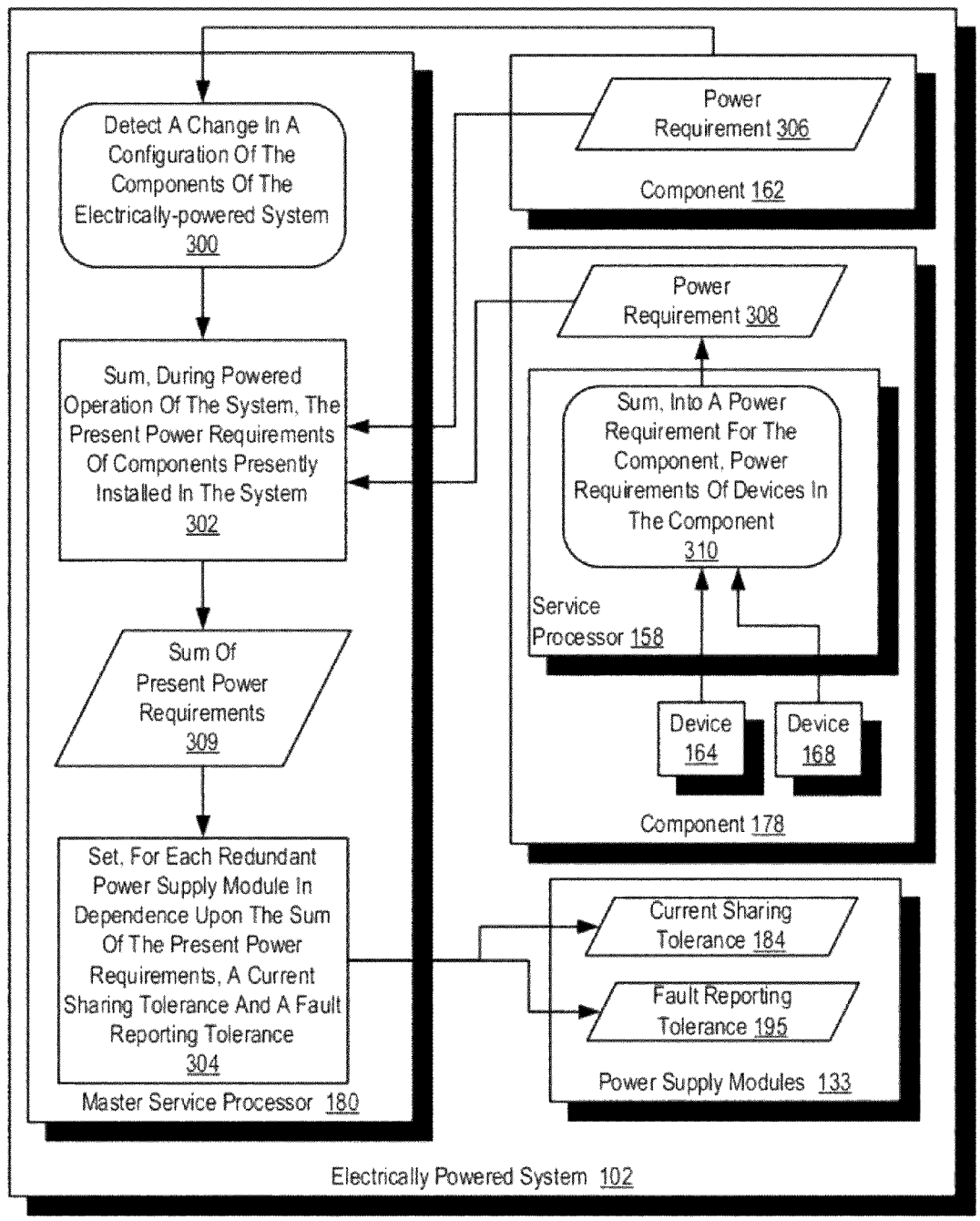
FIG. 3 sets forth a flow chart illustrating an exemplary method for dynamically configuring current sharing and fault monitoring in redundant power supply modules according to embodiments of the present invention.

For further explanation, FIG. 3 sets forth a flow chart illustrating an exemplary method for dynamically configuring current sharing and fault monitoring in redundant power supply modules (133) for components (162, 178) of an electrically powered system (102) according to embodiments of the present invention that includes detecting (300) by a master service processor (180) a change in a configuration of the components of the electrically powered system. The detecting step in this example is represented as optional. It is entirely within the scope of the present invention for a system to dynamically configure current sharing and fault monitoring in redundant power supply modules without detecting changes in configuration of components. A system could, for example, periodically poll all the component slots in the system for power requirements. When a system does detect changes in configuration, detecting changes in configuration may be carried out by detecting hot swapping of components into and out of the system configuration as described above with reference to FIG. 2. In addition, when a system does detect changes in configuration, the system can then sum the present power requirements of components presently installed in the system and set current sharing and fault reporting tolerances of the power supply modules in response to detection of changes in configuration of the components of the system.

The method of FIG. 3 also includes a further optional step of summing (310) by a service processor (158) of a component (178), into a power requirement (308) for the component (178), power requirements of devices (164, 168) in the component. Summing power requirements of devices in a component by a service processor of the component is said to be optional because there are other ways to obtain the power requirements of the component. A master service processor may obtain the power requirement of a component from VPD of the component, for example, with the VPD stored either on the component itself or elsewhere. The service processor (158) may sum the power requirements of the devices by polling the devices themselves for their power requirements, as for example by data communications through buses (159, 160 on FIG. 2). The service processor may sum the power requirements of the devices by retrieving the power requirements from previously stored information in computer memory (154 on FIG. 2). And the service processor may sum the power requirements of the devices by other means as will occur to those of skill in the art. When a master service processor (180) sums the present power requirements of components presently installed in the system, the service processor (158) on component (178) may provide to the master service processor its summed power requirement (308) as the present power requirement of component (178).

The method of FIG. 3 also includes summing (302) by a master service processor (180), during powered operation of the system (102), the present power requirements (306, 308) of components (162, 178) presently installed in the system. The master service processor may sum the power requirements of the components (162, 178) by polling the components for their power requirements, as for example, by use of data communications through buses (185, 187 on FIG. 2). Components can share virtual memory space with the master service processor, and the master service processor can poll for component power requirements by reading the power requirement for a component from a predefined memory location. In this example, component (162) is configured with its own power requirement (306), which component (162) can provide to the master service processor (162) when polled. Component (178) has its power requirement (308) available for the master service processor upon polling, which was derived by summing the power requirements of devices (164, 168) in component (178).

The method of FIG. 3 also includes setting (304) by the master service processor (180) a current sharing tolerance (184) and a fault reporting tolerance (195) for each of the power supply modules (133) in dependence upon the sum (309) of the present power requirements of the components. Setting current sharing (184) and a fault reporting (195) tolerances is described in more detail below with reference to FIG. 6.

Figure 4:
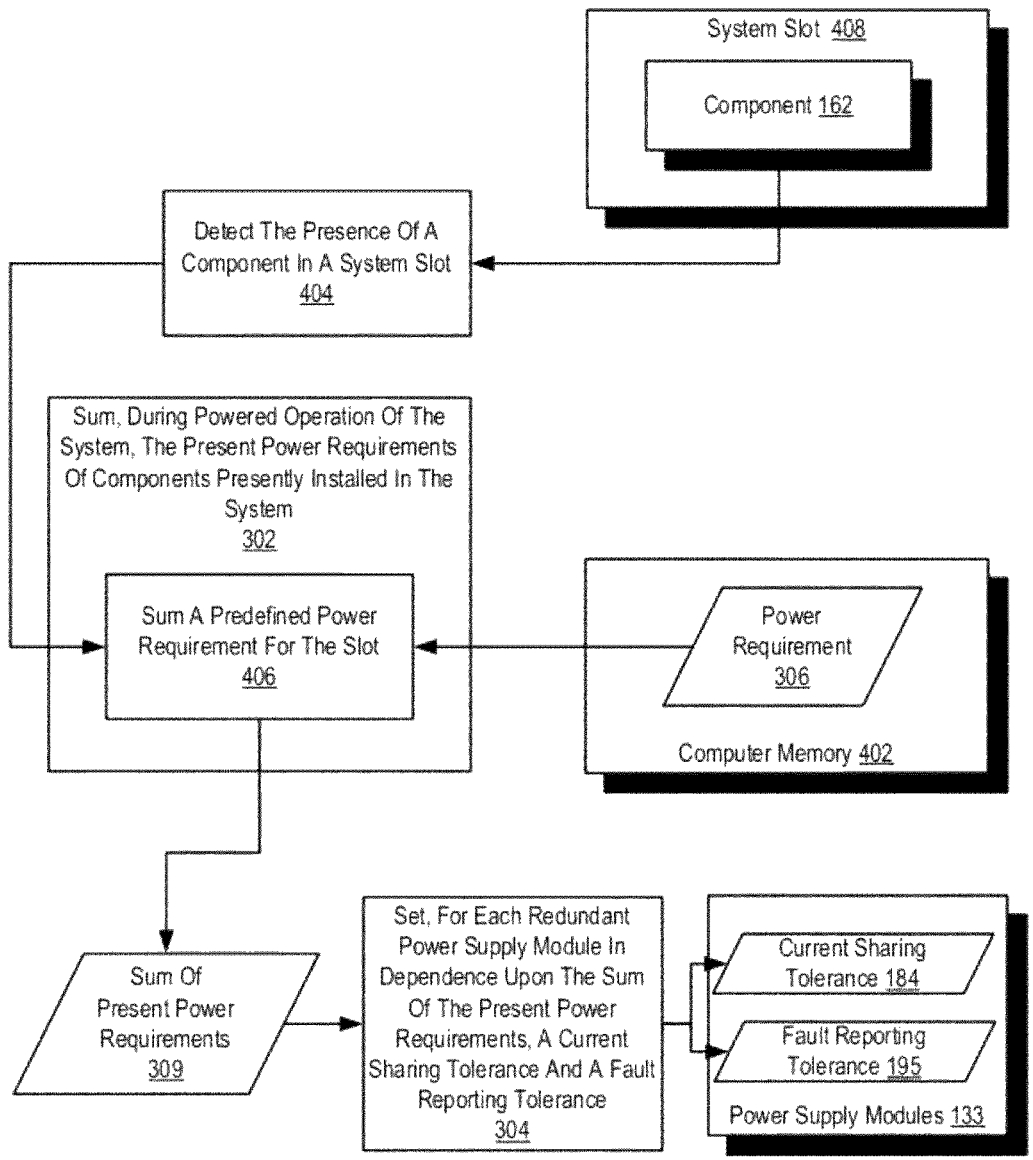
FIG. 4 sets forth a flow chart illustrating a further exemplary method for dynamically configuring current sharing and fault monitoring in redundant power supply modules according to embodiments of the present invention FIG. 5 sets forth a flow chart illustrating a further exemplary method for dynamically configuring current sharing and fault monitoring in redundant power supply modules according to embodiments of the present invention.

For further explanation, FIG. 4 sets forth a flow chart illustrating a further exemplary method for dynamically configuring current sharing and fault monitoring in redundant power supply modules (133) according to embodiments of the present invention. The method of FIG. 4 is similar to the method of FIG. 3, including, as it does, summing (302) the present power requirements of components presently installed in the system, setting (304) a current sharing tolerance and a fault reporting tolerance and so on, and so on, all of which operate in a manner similar to that described above for the method of FIG. 3. The method of FIG. 4, however, also includes detecting (404) the presence of a component (162) in a system slot (408). An electrically powered system may detect the presence of a component in a system slot by polling the slot for an indication of component presence, by recording the presence in the slot of a plug-and-play component at boot time, by detecting a hot swap of a component into the system slot, or by other methods as will occur to those of skill in the art.

An additional difference between the method of FIG. 3 and the method of FIG. 4 is that, in the method of FIG. 4, summing (302) the present power requirements of components presently installed in the system is carried out by summing (406) a predefined power requirement (306) for the slot (408). A predefined power requirement for each system slot may be installed in computer memory (402) in table form, for example, in a table similar to Table 1. Using a table similar to Table 1, the master service processor (180) may retrieve from such a table the power requirement for each system slot presently occupied by a component, and use the retrieved power requirements when summing the present power requirements of components presently installed in the system.

Figure 5:
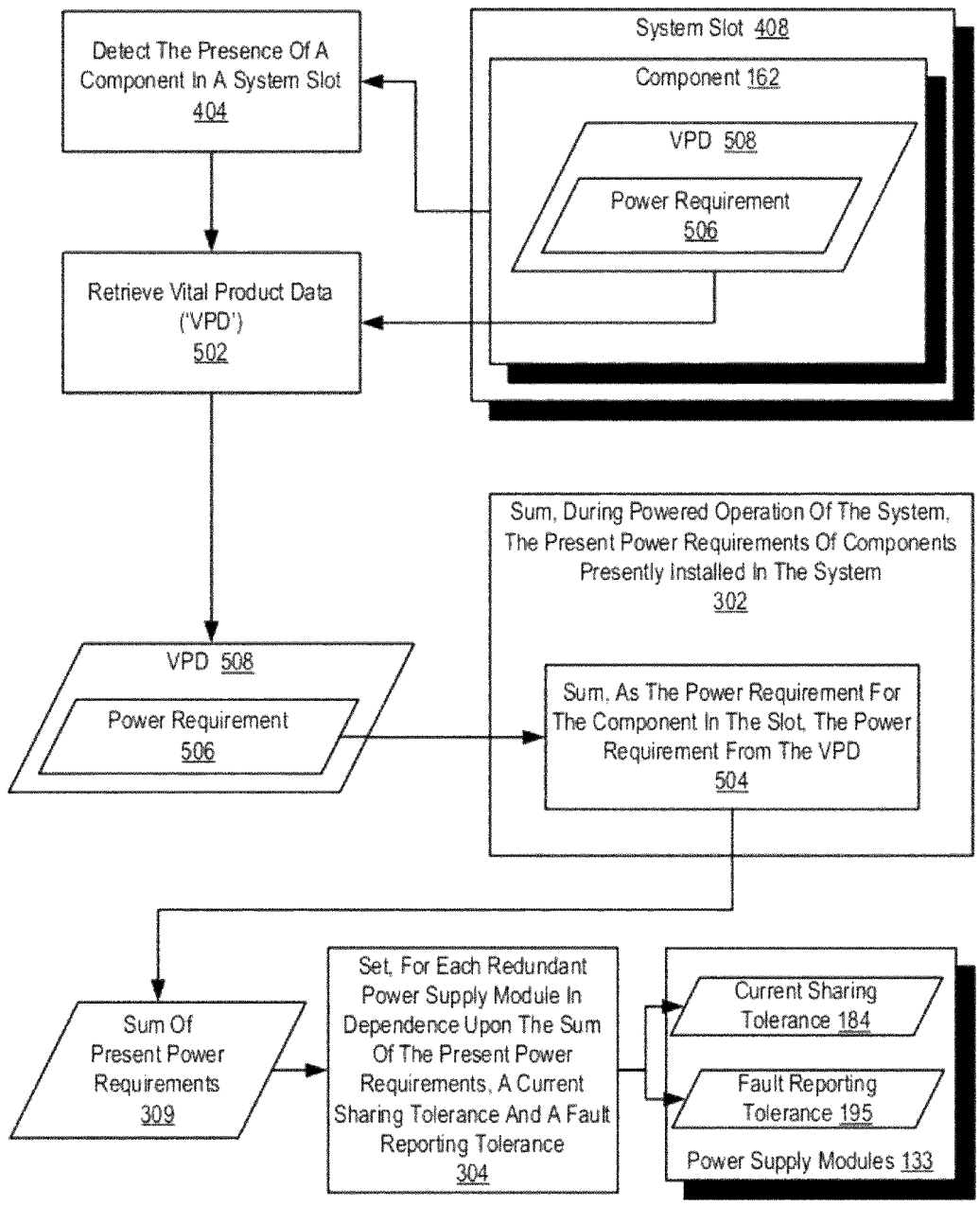

For further explanation, FIG. 5 sets forth a flow chart illustrating a further exemplary method for dynamically configuring current sharing and fault monitoring in redundant power supply modules (133) according to embodiments of the present invention. The method of FIG. 5 is similar to the method of FIG. 3, including, as it does, summing (302) the present power requirements of components presently installed in the system, setting (304) a current sharing tolerance and a fault reporting tolerance and so on, and so on, all of which operate in a manner similar to that described above for the method of FIG. 3. The method of FIG. 5, however, also includes detecting (404) the presence of a component (162) in a system slot (408). An electrically powered system may detect the presence of a component in a system slot by polling the slot for an indication of component presence, by recording the presence in the slot of a plug-and-play component at boot time, by detecting a hot swap of a component into the system slot, or by other methods as will occur to those of skill in the art.

The method of FIG. 5 also includes retrieving (502) vital product data ('VPD') from the component (162) in the slot (508). The VPD generally includes information about the component that allows the component to be administered at a system level, and in this example, the VPD includes a power requirement (506) for the component (162). As an alternative to retrieving VPD from the component itself, the VPD could also be retrieved from system memory elsewhere in the system, such as, for example, the power supply memory illustrated at reference (190) on FIG. 2. In the method of FIG. 5, summing (302) the present power requirements of components presently installed in the system is carried out by summing (504), as the power requirement for the component in the slot, the power requirement (506) from the VPD (508).

Figure 6:
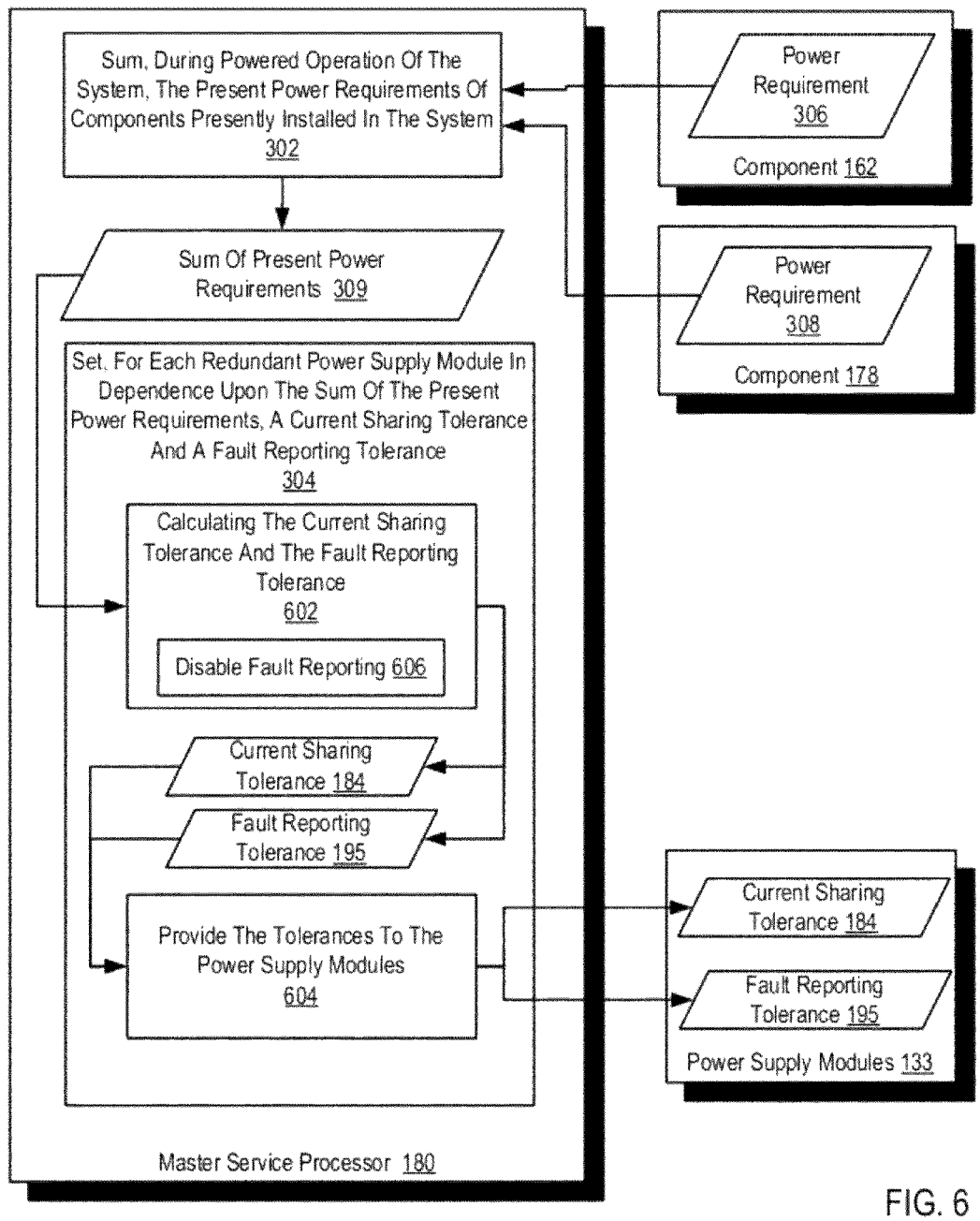
FIG. 6 sets forth a flow chart illustrating a further exemplary method for dynamically configuring current sharing and fault monitoring in redundant power supply modules according to embodiments of the present invention.

For further explanation, FIG. 6 sets forth a flow chart illustrating a further exemplary method for dynamically configuring current sharing and fault monitoring in redundant power supply modules (133) according to embodiments of the present invention. The method of FIG. 6 is similar to the method of FIG. 3, including, as it does, summing (302) the present power requirements of components presently installed in the system, setting (304) a current sharing tolerance and a fault reporting tolerance and so on, and so on, all of which operate in a manner similar to that described above for the method of FIG. 3.

In the method of FIG. 6, however, the master service processor sets (304) a current sharing tolerance (184) and a fault reporting tolerance (195) for each redundant power supply module (133) in dependence upon the sum (309) of the present power requirements by calculating (602), in dependence upon the sum (309), the current sharing tolerance (184) and the fault reporting tolerance (195) and providing (604) the calculated tolerances to the redundant power supply modules (133). The master service processor may provide the tolerances to the power supply modules through data communications on an out-of-band network such as the one illustrated, for example, and discussed above with reference to bus (196) on FIG. 2.

The master service processor may calculate a current sharing tolerance and a fault reporting tolerance in dependence upon the sum by finding in a table that associates values of present power requirements with current sharing and fault reporting tolerances, the current sharing and fault reporting tolerances associated with the value of the sum of present power requirements. Such tolerances may be generally inversely proportional to the sum—the greater the sum, the less the tolerances; the less the sum, the greater the tolerance. Lower current sharing tolerances result in more equal current sharing between power supplies. The increase in current load on a power supply module when another power supply module fails is greater in a system having greater power requirements and less when the system has a lesser power requirement. As such, sharing current as equally as possible between power supply modules provides the largest amount of overhead possible to all power supplies to accept such a large increase in current load upon failure of another power supply. Accepting a large current load by a power supply module when that module is supplying current near its maximum possible current supply may result in failure of the power supply module. In a system having a lesser power requirement, sharing current unequally is a lower risk as the increase in current load on a power supply module when another power supply module fails is comparatively less.

In a similar manner, fault reporting that indicates that current sharing is not precisely equally is less useful in an electrically powered system with low present power requirements and great power supply overhead. Moreover, accuracy of the performance of active control algorithms generally decreases with an increase of current supplied by redundant power supply modules. In such cases, a lower fault reporting tolerance may result in the issuance of many non-useful fault reports. The master service processor, therefore, calculates higher fault reporting tolerances for lesser sums, decreasing the number of fault reports caused by variations in current sharing, and calculates lower fault reporting tolerances for greater sums, more precisely reporting faults in current sharing. Such reports may be sent along by the master service processor (180) to a management module of the system which provides may provide the report to a user, sent along to a component of the system causing the component to power-off, or be processed in other ways as will occur to those of skill in the art.

Fault reporting may be entirely unnecessary in electrically powered systems with extremely lower present power requirements. In the method of FIG. 6, therefore, calculating (602) the current sharing tolerance and the fault reporting tolerance also includes disabling (606) fault reporting (606) by the redundant power supply modules (133). The master service processor may disable fault reporting by the power supply modules (133) in several ways such as, for example, by providing, as a fault reporting tolerance, a particular value designated for disabling fault reporting, by setting the fault tolerance to a number so great that the effectively no faults will ever be monitored, by ignoring reports issued by fault monitoring logic of the power supply module, by disabling such fault monitoring logic, or in other ways as will occur to those of skill in the art.

Exemplary embodiments of the present invention are described largely in the context of a fully functional computer system for dynamically configuring current sharing and fault monitoring in redundant power supply modules for components of an electrically powered system. Readers of skill in the art will recognize, however, that the present invention also may be embodied in a computer program product disposed on computer readable, signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
by computer program instructions of a computing device, setting, for at least one redundant power supply module in dependence upon present power requirements of a plurality of components presently installed in an electrically powered system, a current sharing tolerance and a fault reporting tolerance, wherein the current sharing tolerance specifies a maximum amount from which the at least one redundant power supply module may vary from another power supply module.

2. The method of claim 1 further comprising detecting by a master service processor a change in a configuration of the components of the electrically powered system, wherein the setting is carried out in response to the detecting.

3. The method of claim 1 further comprising summing by a service processor of a component, into a power requirement for the component, power requirements of devices in the component.

4. The method of claim 1 further comprising detecting the presence of a component in a system slot, wherein setting a current sharing tolerance and a fault reporting tolerance further comprises summing the present power requirements of components presently installed in the electrically powered system which includes summing a predefined power requirement for the slot.

5. The method of claim 1 further comprising:
detecting the presence of a component in a system slot; and
retrieving vital product data ('VPD') from the component in the slot, the VPD comprising information about the component that allows the component to be administered at a system level, the VPD including a power requirement for the component;
wherein setting a current sharing tolerance and a fault reporting tolerance further comprises summing the present power requirements of components presently installed in the electrically powered system which includes summing, as the power requirement for the component in the slot, the power requirement from the VPD.

6. The method of claim 1 wherein setting a current sharing tolerance and a fault reporting tolerance further comprises:
summing the present power requirements of components presently installed in the electrically powered system;
calculating, in dependence upon the sum, the current sharing tolerance and the fault reporting tolerance; and
providing the calculated tolerances to the redundant power supply modules.

7. The method of claim 6 wherein calculating a current sharing tolerance and a fault reporting tolerance further comprises disabling fault reporting by the redundant power supply modules.

8. An apparatus a computer processor and a computer memory operatively coupled to the computer processor, the computer memory having disposed within it computer program instructions that when executed by the computer processor cause the apparatus to carry out the steps of:
setting, for at least one redundant power supply module in dependence upon present power requirements of a plurality of the components presently installed in the electrically powered system, a current sharing tolerance and a fault reporting tolerance, wherein the current sharing tolerance specifies a maximum amount from which the at least one redundant power supply module may vary from another power supply module.

9. The apparatus of claim 8 further comprising computer program instructions that when executed by the computer processor cause the apparatus to carry out the steps of: detecting by a master service processor a change in a configuration of the components of the electrically powered system, wherein the setting is carried out in response to the detecting.

10. The apparatus of claim 8 further comprising computer program instructions that when executed by the computer processor cause the apparatus to carry out the steps of: summing by a service processor of a component, into a power requirement for the component, power requirements of devices in the component.

11. The apparatus of claim 8 further comprising computer program instructions that when executed by the computer processor cause the apparatus to carry out the steps of: detecting the presence of a component in a system slot, wherein setting a current sharing tolerance and a fault reporting tolerance further comprises summing the present power requirements of components presently installed in the electrically powered system which includes summing a predefined power requirement for the slot.

12. The apparatus of claim 8 further comprising computer program instructions that when executed by the computer processor cause the apparatus to carry out the steps of:
detecting the presence of a component in a system slot; and
retrieving vital product data ('VPD') from the component in the slot, the VPD comprising information about the component that allows the component to be administered at a system level, the VPD including a power requirement for the component;
wherein setting a current sharing tolerance and a fault reporting tolerance further comprises summing the present power requirements of components presently installed in the electrically powered system which includes summing, as the power requirement for the component in the slot, the power requirement from the VPD.

13. The apparatus of claim 8 wherein setting a current sharing tolerance and a fault reporting tolerance further comprises:
  summing the present power requirements of components presently installed in the electrically powered system;
  calculating, in dependence upon the sum, the current sharing tolerance and the fault reporting tolerance; and
  providing the calculated tolerances to the redundant power supply modules.

14. The apparatus of claim 13 wherein calculating a current sharing tolerance and a fault reporting tolerance further comprises disabling fault reporting by the redundant power supply modules.

15. A computer program product for dynamically configuring current sharing and fault monitoring in redundant power supply modules for components of an electrically powered system, the computer program product disposed in a computer readable, recordable medium, the computer program product comprising computer program instructions that when executed by the computer processor cause a computer to carry out the steps of:
  setting, for at least one redundant power supply module in dependence upon present power requirements of a plurality of the components presently installed in the electrically powered system, a current sharing tolerance and a fault reporting tolerance, wherein the current sharing tolerance specifies a maximum amount from which the at least one redundant power supply module may vary from another power supply module.

16. The computer program product of claim 15 further comprising computer program instructions that when executed by the computer processor cause the computer to carry out the steps of: detecting by a master service processor a change in a configuration of the components of the electrically powered system, wherein the setting is carried out in response to the detecting.

17. The computer program product of claim 15 further comprising computer program instructions that when executed by the computer processor cause the computer to carry out the steps of: summing by a service processor of a component, into a power requirement for the component, power requirements of devices in the component.

18. The computer program product of claim 15 further comprising computer program instructions that when executed by the computer processor cause the computer to carry out the steps of: detecting the presence of a component in a system slot, wherein setting a current sharing tolerance and a fault reporting tolerance further comprises summing the present power requirements of components presently installed in the electrically powered system which includes summing a predefined power requirement for the slot.

19. The computer program product of claim 15 further comprising computer program instructions that when executed by the computer processor cause the computer to carry out the steps of:
  detecting the presence of a component in a system slot; and
  retrieving vital product data ('VPD') from the component in the slot, the VPD comprising information about the component that allows the component to be administered at a system level, the VPD including a power requirement for the component;
  wherein setting a current sharing tolerance and a fault reporting tolerance further comprises summing the present power requirements of components presently installed in the electrically powered system which includes summing, as the power requirement for the component in the slot, the power requirement from the VPD.

20. The computer program product of claim 15 wherein setting a current sharing tolerance and a fault reporting tolerance further comprises:
  summing the present power requirements of components presently installed in the electrically powered system;
  calculating, in dependence upon the sum, the current sharing tolerance and the fault reporting tolerance; and
  providing the calculated tolerances to the redundant power supply modules.

* * * * *